United States Patent Office 3,799,955
Patented Mar. 26, 1974

3,799,955
METHOD OF MAKING 11 ALPHA- OR 11 BETA-HYDROXY - 18 - NOR - 17-ALPHA-ALKYL-17 BETA-METHYLANDROSTA - 4,13 - DIENE-3-ONES
Giovanni De Marchi and Carlo Scolastico, Milan, Italy, assignors to Laboratorio Prodotti Biologici Braglia S.p.A., Milan, Italy
No Drawing. Filed Jan. 29, 1973, Ser. No. 327,772
Claims priority, application Italy, July 31, 1972, 27,685/72
Int. Cl. C07c 167/00
U.S. Cl. 260—397.45                4 Claims

ABSTRACT OF THE DISCLOSURE

A method for making compounds of the formula

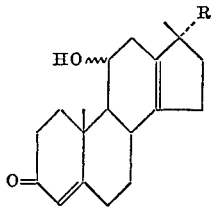

by reacting the corresponding 11-hydroxy-17α-alkylandrosta-4-ene-17β-ol-3-one with a catalytic amount of ethylene glycol and p-toluene sulfonic acid, thereby assuring ketalization while causing reverse pinacol rearrangement to produce the intermediate 11-hydroxy-18-nor-17α-alkyl - 17β-methylandrosta-5,13-diene-3-ethyleneketal and hydrolyzing the intermediate in a solution of acetone, ethanol, or methanol in the presence of a catalytic amount of HCl is disclosed.

---

This invention relates to a process for the preparation of 11β - hydroxy or 11α-hydroxy-18-nor-17α-alkyl-17β-methylandrosta-4,13-diene-3-ones of the general formula:

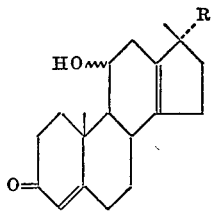

in which R is an alkyl group, having 1 to 4 carbon atoms, or a vinyl or ethynyl group. The compounds prepared by the method of this invention are utilized as starting materials for the synthesis of the corresponding 2-formyl-18-nor - 17α - alkyl-17β-methylandrosta-1,4,13-triene-3-ones, which possess a hydroxyl group in the 11β or 11α position. The said formyl compounds have utilities as taught in U.S. Pat. No. 3,694,470, granted Sept. 26, 1972 to Piero Gomarasca and Carlo Scolastico, and commonly assigned herewith.

In general, the 11β-hydroxy or 11α-hydroxy-18-nor-17α - alkyl-17β-methylandrosta-4,13-diene-3-one is prepared from the corresponding 11β-hydroxy or 11α-hydroxy - 17α-alkylandrosta-4-ene-17β-ol-3-one by reverse pinacol rearrangement in an acid environment. In any case, such a process does not give optimal yield due to the fact that the modification of the desired structure is accompanied by a dehydration of the hydroxyl in position 11.

It has been found that this inconvenience can be mitigated by effecting the reverse pinacol rearrangement, not on the 3-keto Δ⁴-steroids but on the Δ⁵-3-ethylene-ketals; in this manner, the operation can be carried out much more easily and in conditions that are much more mild, notably in the presence of much smaller quantities of acids, that is, in the same conditions in which one can successfully carry out the conversion of Δ⁴-3-keto-steroids to Δ⁴-ethyleneketals.

The process involved in the present invention is carried out in two steps; in the first step, there is simultaneously:

(a) a ketalization of Δ⁴-3-ketosteroid, to Δ⁵-3-alkylketal, and,
(b) a reverse pinacol rearrangement, by means of which one passes from 11β-(or 11α-) hydroxy-17α-alkylandrosta-4-ene-3-one [or 11α-(or 11β-)hydroxy-17α-alkylestosterone], to 11α-or 11β-) hydroxy-18-nor-17α-alkyl-17β-methylandrosta-3,13-diene-3-ethyleneketal, by operating at the boiling point, in a solution of benzene or xylene, or preferably toluene, in the presence of ethylene glycol and a catalytic quantities of p-toluene sulfonic acid, in a period of time varying between 3 and 5 hours.

In the second step of hydrolysis is carried out on the ketalic group of compounds obtained in the first step, in a solution of acetone, of ethanol, or preferably of methanol, in the presence of catalytic quantities of 1 N HCl at the boiling point: the hydrolysis takes place immediately.

The solution obtained is diluted with methylene chloride and washed with water; it is then evaporated and dried, and the residue of evaporation is crystallized in ethyl ether. A 100% pure product is obtained. In this manner, it is possible to isolate 11β-(or 11α-)-hydroxy-18-nor-17α-alkyl-17β-methylandrosta-4,13-diene-3-ones, with optimum yield (about 83% for 11β, and about 85% for 11α). In practice, it is necessary however to take note that the operations described herein are particularly valid for compounds of the series of 11α-hydroxy-18-nor-17α-alkylandrosta-5,13-diene-3-ethyleneketals, which may be isolated and separated by crystallization (e.g. in the case of 17α-methyl derived from aqueous methanol). On the other hand, in the compounds of the 11β-hydroxy-18-nor-17α - alkyl-17β-methylandrosta-5,13-diene-3-ethyleneketal series, the grouping of 3-ketal-Δ⁵ appears extremely unstable and, in attempts at crystallization, give rise to mixtures of 3-keto-Δ⁴ and 3-ketal-Δ⁵. As a result, in this case, the process described above does not take place, for the hydrolysis is immediate, manifesting itself immediately with the first slight traces of humidity.

The sensitivity of the products of the hydrolysis is such that, according to tests done on the subject, merely the acidity of certain solvents is sufficient to permit a partial hydrolysis to take place.

This is the reason that the hydrolysis takes place immediately without crystallization of the products of the first step, in the case of these compounds of the 11β-hydroxy series. The best yield can be obtained by using a solution of ethylene glycol and using catalytic quantities of toluene sulfonic acid, operating directly on the Δ⁴-3-ketosteroids. In this case, the reaction takes place much more rapidly (times varying between 15 and 30 minutes) and the results are better.

Using only ethylene glycol as a solvent, it is possible to produce the reaction in a single step, without first isolating the 11α- or 11β-hydroxy-17,17-dimethyl-18-norandrosta-5,13-diene-3-ethyleneketal, which, on the contrary, is hydrolyzed directly into 11α- or 11β-hydroxy-17,17-dimethyl-13-norandrosta-4,13-diene-3-one.

The invention will be better understood by reading the following examples which are not to be considered limiting.

EXAMPLE 1

11α-hydroxy-18-nor-17,17-dimethylandrosta-5,13-diene-3-ethyleneketal

A solution of 1 gram of 11α-hydroxy-17-methyltestosterone in 50 ml. of toluene and 8 ml. of ethylene glycol is boiled for 3 hours, after addition of 40 mg. of p-toluene sulfonic acid, using a Marcusson device for eliminating the toluene-water azeotrope. The solution is then washed with a solution saturated with NaHCO$_3$, then with water. The solution is dried on Na$_2$SO$_4$ and evaporated at reduced pressure until desiccated.

The result is 1 gram of product which can be utilized directly for hydrolysis. Nevertheless, 100 mg. crystallized in a methanol-water environment, yields 85 mg. of 11α-hydroxy-18-nor-17,17-dimethylandrosta - 5,13 - diene-3-ethyleneketal, with a melting point of 170–172° C.

$[\alpha]_D^{25°}$ —108° (c.=1% in CCl$_4$)
Analyzing for C$_{22}$H$_{31}$O$_3$:
Percent calculated C=76.70, H=9.36
Percent obtained C=76.67, H=9.60

EXAMPLE 2

11β-hydroxy-18-nor-17,17-dimethylandrosta-5,13-diene-3-ethyleneketal

Forty mg. of p-toluene sulfonic acid is added to a solution of 1 g. of 11β-hydroxy-methyltestosterone in 50 ml. of toluene and 8 ml. of ethylene glycol. After 4 hours of refluxing with agitation and elimination of the water-toluene azeotrope by means of a Marcusson device, the mixture is cooled to ambient temperature and washed with a saturated solution of NaHCO$_3$, then with water.

The product thus obtained is dried on Na$_2$SO$_4$ and the thin layer of evaporation residue is examined. The reaction mixture (0.995 g.) is seen to be composed of 70% of 11β - hydroxy-18-nor-17,17-dimethylandrosta-5,13-diene-3-ethyleneketal having a melting point of 130–132° C. and 30% of 11β-hydroxy-18-nor-17,17-dimethylandrosta-4,13-diene-3-one, having a melting point of 179–180° C. $[\alpha]_D^{25°}$ +101° (c.=1% of dioxane).

The presence of the latter, as in the results obtained above, is due to the great ease of hydrolysis of 11β-hydroxy-18-nor-17,17-dimethylandrosta-5,13-diene - 3 - ethyleneketal.

To augment the yield of the reaction, the mixture of 11β-hydroxy-18-nor-17,17-dimethylandrosta - 5,13 - diene-3-ethyleneketal and of 11β-hydroxy-18-nor-17,17-dimethylandrosta-4,13-diene - 3 - one should be immediately subjected to hydrolysis.

EXAMPLE 3

11β-hydroxy-18-nor-17,17-dimethylandrosta-4,13-diene-3-one 0.2 ml. of 1 N hydrochloric acid is added to a solution of 1 g. of 11α-hydroxy-18-nor-17,17-dimethylandrosta-5,13-diene-3-ethyleneketal in 20 ml. of methanol and heated for 10 minutes. The solution is diluted with 40 ml. of methylene chloride, washed with 30 ml. of water, dried on Na$_2$SO$_4$ and taken to dryness.

The product is crystallized from ethyl ether and there is obtained 0.850 g. with a melting point of 164–166° C. $[\alpha]_D^{25°}$ +86° (c.=1% dioxane).

U.V.=λ$_{max.}$ (methanol) at 240 mμ (ε=15780)
I.R.=bands at 3410, 1658, 1610 cm.$^{-1}$.
In the analysis for C$_{20}$H$_{28}$O$_2$:
Calculated: Percent C=79.96, H=9.40
Obtained: Percent C=79.90, H=9.44

EXAMPLE 4

11β-hydroxy-18-nor-17,17-dimethylandrosta-4,13-diene-3-one

Following a procedure analogous to that described in Example 3, with 1 g. of a mixture of 11β-hydroxy-18-nor-17,17-dimethylandrosta - 5,13 - diene-3-one and 11β-hydroxy-18-nor-17,17-dimethylandrosta-4,13-diene - 3 - one, there is obtained 0.830 g. of 11β-hydroxy-18-nor-17,17-dimethylandrosta-4,13-diene-3-one with a melting point of 179–180° C. $[\alpha]_D^{35°}$=101° (c.=1% dioxane).

U.V.=λ$_{max.}$ (methanol) at 240 mμ (ε=15240)
I.R.=bands at 3390, 1650, 1612 cm.$^{-1}$.
In the analysis for C$_{30}$H$_{28}$O$_2$:
Calculated: Percent C=79.60, H=9.40
Obtained: Percent C=79.80, H=9.53.

EXAMPLE 5

11α-hydroxy-18-nor-17,17-dimethylandrosta-4,13-diene-3-one 40 mg. of p-toluene sulfonic acid was added to a solution of 1 g. of 11α-hydroxy-17-methyltestosterone in 10 ml. of anhydrous ethylene glycol.

The mixture is agitated for 20 minutes at 140° C., and then the temperature is lowered to 100° C. and 1 ml. of 1 N HCl was added. After 15 minutes of agitation at that temperature, the solution is poured into a mixture of ice and salt. The solid thus formed is filtered, washed with water, melted in 15 ml. of methylenechloride, dried on Na$_2$SO$_4$ and evaporated in a vacuum. The residue of the evaporation, crystallized in ethyl ether, gives 0.9 g. of 11α-hydroxy-18-nor-17,17-dimethylandrosta - 4,13 - diene-3-one; melting point of 164–166° C.

In the analysis for C$_{20}$H$_{28}$O$_2$:
Calculated: Percent C=79.96, H=9.40
Obtained: Percent C=79.85, H=9.43.

EXAMPLE 6

11β-hydroxy-18-nor-17,17-dimethylandrosta-4,13-diene-3-one

Operating in the same fashion on 11β - hydroxy - 17-methyltestosterone, there is obtained 11β-hydroxy-18-nor-17,17-dimethylandrosta-4,13-diene-3-one with a yield of 93%.

What is claimed is:

1. Process for the preparation of 11-hydroxy-18-nor-17α-alkyl-17β-methylandrosta-4,13-diene - 3 - one having the general formula:

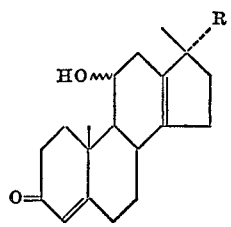

wherein R is an alkyl group having 1 to 4 carbon atoms, a vinyl group, or an ethynyl group, and said 11-hydroxy group is in the 11α or the 11β-position, said process comprising the steps of:

(a) reacting 11α- or 11β-hydroxy-17α-alkylandrosta-4-ene-17β-ol-3-one with a catalytic amount of ethylene glycol and p-toluene sulfonic acid at the boiling point, thereby assuring ketalization while simultaneously causing reverse pinacol rearrangement, to thereby produce the intermediate product 11α- or 11β-hydroxy-18-nor-17α-alkyl - 17β - methylandrosta-5,13-diene-3-ethyleneketal; and (b) hydrolyzing said intermediate product in a solution of acetone, ethanol, or methanol, in the presence of a catalytic amount of HCl at the boiling point.

2. The process of claim 1, wherein step (a) is performed in a solvent of benzene, xylene, or toluene.

3. The process of claim 2, wherein said solvent is toluene.

4. The process of claim 1, wherein the solvent in step (b) is methanol.

References Cited
UNITED STATES PATENTS
3,694,470  9/1972  Gomarasca et al. __ 260—397.45

HENRY A. FRENCH, Primary Examiner

U.S. Cl. X.R.
260—239.55 C